US011954960B2

(12) United States Patent
Izumida et al.

(10) Patent No.: US 11,954,960 B2
(45) Date of Patent: Apr. 9, 2024

(54) MONEY HANDLING MACHINE

(71) Applicant: Glory Ltd., Himeji (JP)

(72) Inventors: Tsuyoshi Izumida, Hyogo (JP); Shinsuke Shibata, Hyogo (JP); Fumiaki Koga, Hyogo (JP)

(73) Assignee: GLORY LTD., Himeji (JP)

( * ) Notice: Subject to any disclaimer, the term of this patent is extended or adjusted under 35 U.S.C. 154(b) by 138 days.

(21) Appl. No.: 17/693,430

(22) Filed: Mar. 14, 2022

(65) Prior Publication Data

US 2022/0292905 A1 Sep. 15, 2022

(30) Foreign Application Priority Data

Mar. 15, 2021 (JP) ................................ 2021-041276

(51) Int. Cl.

*G07D 11/125* (2019.01)
*G07D 7/0047* (2016.01)
*G07D 11/16* (2019.01)
*G07D 11/22* (2019.01)

(52) U.S. Cl.

CPC ......... *G07D 11/125* (2019.01); *G07D 7/0047* (2017.05); *G07D 11/16* (2019.01); *G07D 11/22* (2019.01); *G07D 2211/00* (2013.01)

(58) Field of Classification Search

CPC ...... G07D 11/125; G07D 11/16; G07D 11/22; G07D 11/14; G07D 7/0047; G07D 2211/00
USPC ........................................................... 232/15
See application file for complete search history.

(56) References Cited

U.S. PATENT DOCUMENTS 4,962,919 A * 10/1990 Azuchi .................. G07D 11/14 271/9.01
7,976,005 B2 * 7/2011 Ichikawa ............ B65H 83/025 271/3.14
8,561,888 B1 * 10/2013 Graef ..................... G07D 7/181 235/375
8,579,278 B2 * 11/2013 Arikata ................ B65H 29/006 271/9.12
8,893,959 B1 * 11/2014 Graef ..................... G07D 11/24 235/379
9,004,352 B1 * 4/2015 Graef .................... G07F 19/202 235/491
9,240,107 B2 * 1/2016 Yun .................... B65H 31/3072
10,167,151 B2 * 1/2019 Okamoto ................. B65H 5/38
11,386,738 B1 * 7/2022 Takashima ............. G07D 11/22
11,482,065 B2 * 10/2022 Kuroda .................. G07D 11/24

(Continued)

FOREIGN PATENT DOCUMENTS

EP 4102476 A1 * 12/2022 .......... G07D 11/237
JP 3037813 B2 5/2000
JP 2010-33416 A 2/2010

OTHER PUBLICATIONS

Extended European Search Report dated Aug. 4, 2022, in EP22162085.9.

*Primary Examiner* — William L Miller
(74) *Attorney, Agent, or Firm* — XSENSUS LLP

(57) ABSTRACT

A storage stores money. An outlet can receive money delivered from the storage therein. The outlet is configured to allow the money to be removed from the inside of the outlet. A detector detects a removal action associated with removal of money from the outlet. The controller switches a process on money remaining in the outlet based on a detection result of the detector.

11 Claims, 9 Drawing Sheets

(56) References Cited

U.S. PATENT DOCUMENTS

| | | | | |
|---|---|---|---|---|
| 11,694,524 | B2 * | 7/2023 | Lee | G07D 11/40<br>235/379 |
| 2007/0023988 | A1 | 2/2007 | Abe et al. | |
| 2011/0049020 | A1 * | 3/2011 | Finnie | G07D 11/16<br>271/220 |
| 2011/0215034 | A1 * | 9/2011 | Mennie | B07C 5/34<br>209/534 |
| 2015/0100480 | A1 * | 4/2015 | Colvin | G07D 11/40<br>705/39 |
| 2016/0063793 | A1 * | 3/2016 | Nishino | G07D 7/00<br>194/206 |
| 2016/0335614 | A1 | 11/2016 | Norota | |
| 2018/0082511 | A1 * | 3/2018 | Hemmi | G07D 11/0087 |
| 2018/0313135 | A1 * | 11/2018 | Westington | G07F 19/209 |
| 2019/0092598 | A1 * | 3/2019 | Nishimura | G07D 11/23 |
| 2019/0333343 | A1 * | 10/2019 | Harty | G07F 19/202 |
| 2020/0082657 | A1 * | 3/2020 | Beskitt | B65H 9/101 |
| 2020/0090471 | A1 * | 3/2020 | Beskitt | G07D 11/14 |
| 2020/0327764 | A1 * | 10/2020 | Nishida | G07F 19/203 |
| 2020/0407181 | A1 * | 12/2020 | Beskitt | B65H 9/002 |
| 2021/0201616 | A1 * | 7/2021 | Nakai | B65H 3/063 |
| 2022/0108580 | A1 * | 4/2022 | Hamada | G07D 11/40 |
| 2023/0419765 | A1 * | 12/2023 | Izumida | G07D 11/23 |

* cited by examiner

MONEY HANDLING MACHINE

CROSS-REFERENCE TO RELATED APPLICATION

This application claims priority to Japanese Patent Application No. 2021-041276 filed on Mar. 15, 2021, the disclosure of which including the specification, the drawings, and the claims is hereby incorporated by reference in its entirety.

BACKGROUND

In an automatic correcting method of automated equipment such as an automated trading machine in, for example, a financial institution, money is delivered from a safe by the automated equipment based on a payment telegram from a center to a customer, is counted up while discriminating whether the money is genuine or not, and then is discharged to a receiving part. If money remains in the receiving part after a lapse of a given time, the money is taken in and rediscriminated and counted. The amount counted before discharge is compared with the rediscriminated amount.

If both the amounts coincide with each other, money taken from the receiving part is stored in the safe, and a correction telegram is sent to the center and the account balance of the customer in the center is returned to the balance before payment. If both the amounts do not coincide with each other, the money taken from the receiving part is collected to a non-managed money collection unit for collecting money out of management in the automated equipment.

In such as machine, it cannot be confirmed whether part of money received by a receiving part has been removed or not. Thus, money remaining in the receiving part might fail to be appropriately processed.

For example, all the money cannot be correctly recognized because of a difference in transport direction of money, a failure in transporting money, and so forth. Thus, it is not always correctly determined whether the amount of money received by the receiving part coincides with the amount of money remaining in the receiving part, and thus, it is difficult to appropriately manage the money remaining in the receiving part.

SUMMARY

The money handling machine disclosed here includes: a storage configured to store money; an outlet configured to receive money delivered from the storage in the outlet, the outlet being configured to allow the money to be removed from inside of the outlet; a detector configured to detect a removal action associated with removal of the money from the outlet; and a controller configured to switch a process on money remaining in the outlet, based on a result of detection by the detector.

DETAILED DESCRIPTION

Figure 1:
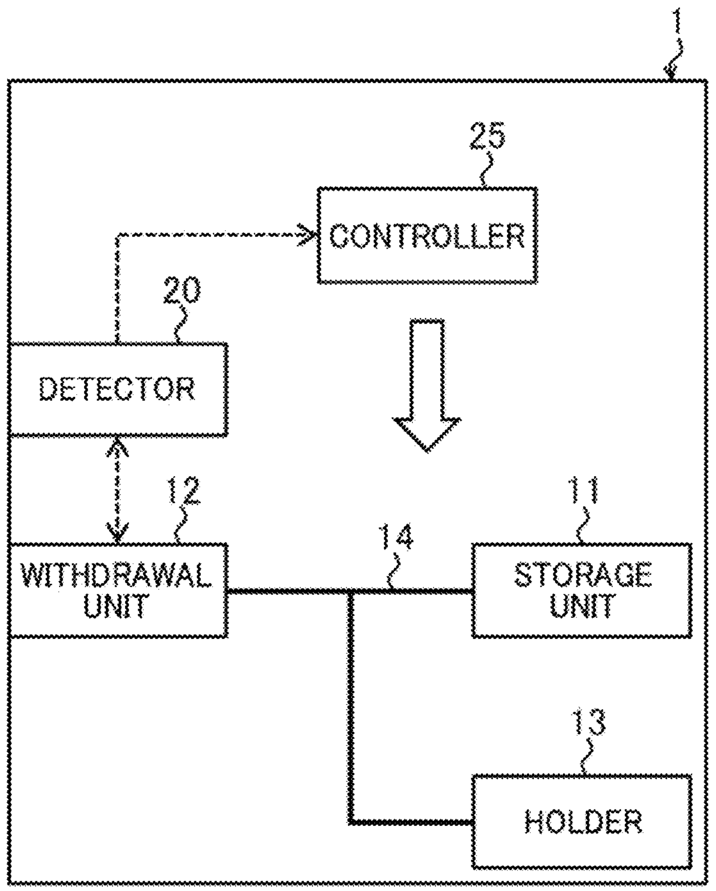
FIG. 1 is a block diagram illustrating a configuration of a money handling machine according to a first embodiment.

The money handling machine disclosed here includes: a withdrawal unit (outlet) configured to receive money therein and allow the money to be removed from the inside of the withdrawal unit; a detector configured to detect a removal action associated with removal of the money; and a controller configured to switch a process on money remaining in the withdrawal unit based on a result of detection by the detector.

In the configuration described above, by detecting the removal action associated with removal of money from the withdrawal unit, it is confirmed that there is a possibility that part of money received by the withdrawal unit has been removed from the withdrawal unit. Then, depending on whether there is a possibility that part of money received by the withdrawal unit has been removed from the withdrawal unit or not, a process on money remaining in the withdrawal unit can be switched. Accordingly, the money remaining in the withdrawal unit can be appropriately processed.

The money handling machine may include a storage unit configured to store the money, and the withdrawal unit may receive money delivered from the storage unit. In this case, the withdrawal unit is used as a destination of withdrawn money in the withdrawal process.

The withdrawal unit may be used as a rejection unit that receives money as a target to be rejected. For example, rejection money determined not to be received in a deposit process or a replacement process is transported to the rejection unit.

The money handling machine may include a transport unit configured to transport money. The controller may control the transport unit to switch a destination to which money remaining in the withdrawal unit is delivered. In the case where the money handling machine includes the storage unit, money delivered from the storage unit is transported to the withdrawal unit by the transport unit.

In the money handling machine, the controller may perform a first process of controlling an operation of the money handling machine such that the money remaining in the withdrawal unit is transported into the money handling machine in a case where the detector does not detect the removal action. In the first process, the money remaining in the withdrawal unit may be transported to the storage unit. The controller may be configured to perform a second process on the money remaining in the withdrawal unit in a case where the detector detects the removal action, and the second process is different from the first process.

The result of detection by the detector may be a detection result before a lapse of a predetermined time from when money delivered from the storage unit is received by the withdrawal unit.

For example, the controller may be configured to perform the first process in the case where the detector does not detect the removal action before a lapse of a predetermined time from when money delivered from the storage unit is received by the withdrawal unit. The controller may be configured to perform the first process in the case where the detector does not detect the removal action by the time when a predetermined time elapses from the time when money delivered from the storage unit is received by the withdrawal unit.

The money handling machine may include a holder configured to hold the money. The holder is a structure different from the storage unit. In the second process, the controller may control an operation of the money handling machine such that money remaining in the withdrawal unit is transported to the holder. The holder may store only the money remaining in the withdrawal unit.

The money handling machine may include a recognition unit configured to recognize the money. The controller may switch a process on the money remaining in the withdrawal unit depending on a result of recognition by the recognition unit, in addition to the detection result by the detector. In the second process, the controller may switch the process on money remaining in the withdrawal unit depending on a recognition result by the recognition unit.

For example, the money handling machine may include a holder configured to hold the money, and the controller may perform control in the second process such that money remaining in the withdrawal unit is finally transported to one of the holder or the storage unit depending on a recognition result by the recognition unit.

The recognition result may include at least one of the number of the money or a type of the money.

The recognition result may include recognition information for recognizing the money. The recognition information may be a serial number of money.

The recognition result may include a first recognition result that is a result of recognition by the recognition unit performed on money delivered from the storage unit and received by the withdrawal unit.

The recognition result may include a second recognition result that is a result of recognition by the recognition unit performed on the money remaining in the withdrawal unit.

The controller may switch a process on the money remaining in the withdrawal unit, depending on one or both of the first recognition result and the second recognition result. For example, the controller compares the first recognition result and the second recognition result with each other to thereby switch a process on the money remaining in the withdrawal unit.

For example, the controller may control an operation of the money handling machine in the second process such that the money remaining in the withdrawal unit is transported to the holder in a case where the first recognition result and the second recognition result do not coincide with each other.

The controller may control an operation of the money handling machine in the second process such that the money remaining in the withdrawal unit is transported to the storage unit in a case where the first recognition result and the second recognition result do not coincide with each other.

The money handling machine may include a temporary storage unit configured to temporarily store money. The controller may control an operation of the money handling machine such that the money remaining in the withdrawal unit is delivered from the withdrawal unit, transported to the recognition unit, and then stored in the temporary storage unit and may acquire the second recognition result in the second process. The controller may control an operation of the money handling machine in the second process such that the money stored in the temporary storage unit is transported to the holder in a case where the first recognition result and the second recognition result do not coincide with each other, and the money stored in the temporary storage unit is transported to the storage unit in a case where the first recognition result and the second recognition result coincide with each other.

The detector may be a sensor. For example, the detector may be an optical sensor. The detector may be an image sensor.

The removal action may include movement money removed from the withdrawal unit. The movement of money may be movement of money from inside of the withdrawal unit to outside of the withdrawal unit.

The removal action may include movement of an object entering the withdrawal unit. The object may be a hand of a person who is removing money.

In the money handling machine, the removal action may include a person in front of the money handling machine. The movement of a person may be movement of a person who is removing money in front of the money handling machine.

In the money handling machine, the detector may detect the removal action and whether the money is present in the withdrawal unit or not.

Embodiments will be described in detail hereinafter with reference to the drawings. In the drawings, the same or corresponding parts are denoted by the same reference characters, and description thereof will not be repeated.

First Embodiment

FIG. 1 illustrates an example configuration of a money handling machine 1 according to a first embodiment. The money handling machine 1 includes a storage unit 11, a withdrawal unit (outlet) 12, a holder 13, a transport unit 14, a detector 20, and a controller 25.

The storage unit 11 stores money.

The withdrawal unit 12 can receive money delivered from the storage unit 11 therein. The withdrawal unit 12 is configured to allow the money to be removed from the inside of the withdrawal unit 12.

The holder 13 holds money.

The transport unit 14 transports money among the storage unit 11, the withdrawal unit 12, and the holder 13.

The detector 20 detects an action associated with removal of money from the withdrawal unit 12. The action associated with removal of money from the withdrawal unit 12 will be hereinafter referred to as a "removal action."

The controller 25 switches a process on money remaining in the withdrawal unit 12, depending on a result of detection by the detector 20.

[Process Performed in Money Handling Machine]

Figure 2:
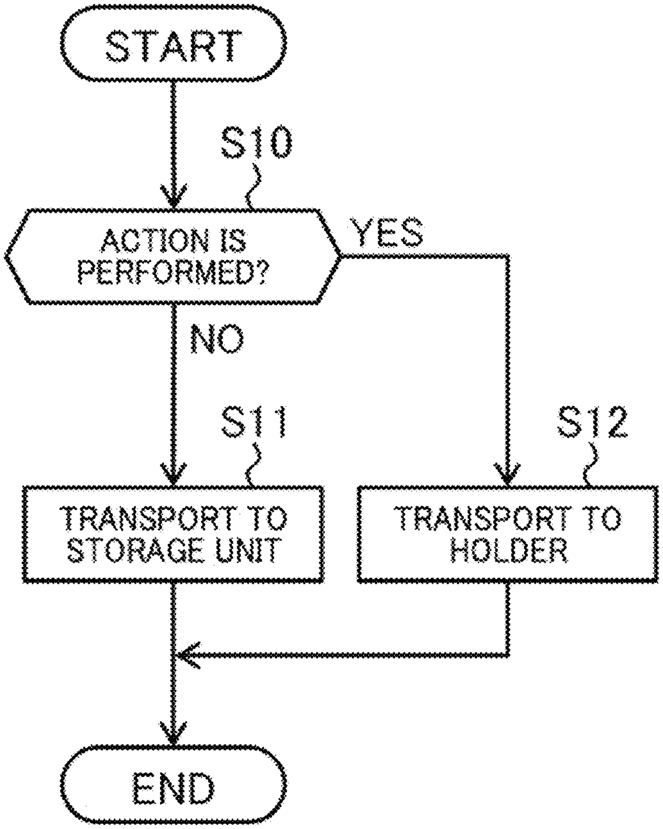
FIG. 2 is a flowchart depicting a money transport process according to the first embodiment.

Referring now to FIG. 2, a money transport process carried out in the money handling machine 1 according to the first embodiment will be described. The money transport process is a process for transporting money remaining in the withdrawal unit 12. For example, the money transport process is carried out in a case where money remains in the withdrawal unit 12 after a lapse of a predetermined time from when money delivered from the storage unit 11 is received by the withdrawal unit 12.

<Step S10>

The controller 25 determines whether a removal action is performed or not.

For example, the controller 25 measures an elapsed time from when money delivered from the storage unit 11 is received by the withdrawal unit 12. If the detector 20 detects the removal action before a lapse of a predetermined time from when money delivered from the storage unit 11 is received by the withdrawal unit 12, the controller 25 determines that the removal action is performed. If the detector 20 does not detect the removal action before a lapse of the predetermined time from when money delivered from the storage unit 11 is received by the withdrawal unit 12, the controller 25 determines that the removal action is not performed.

If the removal action is performed, step S12 is performed, and otherwise, step S11 is performed.

<Step S11>

If the removal action is not performed, the controller 25 performs a first process. In the first process, the controller 25 controls an operation of the money handling machine 1 such that money remaining in the withdrawal unit 12 is transported to the storage unit 11.

<Step S12>

On the other hand, if the removal action is performed, the controller 25 performs a second process different from the first process. In this example, in the second process, the controller 25 controls an operation of the money handling machine 1 such that money remaining in the withdrawal unit 12 is transported to the holder 13.

[Money Leftover in Withdrawal Unit]

In some cases, for some reasons, all the money received by the withdrawal unit 12 is not removed from the withdrawal unit 12, and part of the money received by the withdrawal unit 12 is removed from the withdrawal unit 12 and the other part of the money remains in the withdrawal unit 12. In such cases, the money remaining in the withdrawal unit 12 cannot be appropriately processed only by returning the money remaining in the withdrawal unit 12 to the storage unit 11.

For example, as described above, it is difficult to determine which part of money stored in the storage unit 11 is the "money remaining in the withdrawal unit 12" simply by returning the money remaining in the withdrawal unit 12 to the storage unit 11. Thus, when an operator (e.g., a customer of a bank) who left money in the withdrawal unit 12 requests a return of "money remaining in the withdrawal unit 12," it is difficult to determine which part of the money stored in the storage unit 11 is to be returned to the operator. Even if the "amount of money remaining in the withdrawal unit 12" declared by the operator is larger than an actual amount, it is difficult to confirm whether the amount declared by the operator is a correct amount or not.

As described above, if there is a possibility that part of money received by the withdrawal unit 12 is removed from the withdrawal unit 12, simply performing a normal process cannot appropriately process money remaining in the withdrawal unit 12. In view of this, if there is a possibility that part of money received by the withdrawal unit 12 is removed from the withdrawal unit 12, it is preferable to switch a process on the money remaining in the withdrawal unit 12 from the "normal process" to a "process different from the normal process."

[Advantages of First Embodiment]

As described above, in the first embodiment, the controller 25 switches the process on the money remaining in the withdrawal unit 12, depending on a result of detection by the detector 20 configured to detect a removal action that is an action associated with money removal from the withdrawal unit 12. Specifically, the controller 25 performs the first process of controlling an operation of the money handling machine 1 such that money remaining in the withdrawal unit 12 is transported to the storage unit 11 in a case where the detector 20 does not detect a removal action, and performs the second process different from the first process on money remaining in the withdrawal unit 12 in a case where the detector 20 detects a removal action.

In the manner described above, by detecting an action associated with money removal from the withdrawal unit 12, it is conformed that there is a possibility that part of money received by the withdrawal unit 12 has been removed from the withdrawal unit 12. If there is a possibility that part of money received by the withdrawal unit 12 was removed from the withdrawal unit 12, a process on money remaining in the withdrawal unit 12 can be switched. Accordingly, money remaining in the withdrawal unit 12 can be appropriately processed.

In the first embodiment, the controller 25 controls an operation of the money handling machine 1 in the second process such that money remaining in the withdrawal unit 12 is transported to the holder 13. With such control, in a case where there is a possibility that part of money received by the withdrawal unit 12 was removed, money remaining in the withdrawal unit 12 can be transported to the holder 13. Accordingly, money remaining in the withdrawal unit 12 can be managed in the holder 13 different from the storage unit 11.

In addition, since money remaining in the withdrawal unit 12 is managed by the holder 13, the money remaining in the withdrawal unit 12 can be returned without any process. Accordingly, when an operator (e.g., a customer of a bank) who left money in the withdrawal unit 12 requests a return of "money remaining in the withdrawal unit 12," the money remaining in the withdrawal unit 12 can be appropriately returned.

(Specific Example of Removal Action)

The removal action may include movement of money removed from the withdrawal unit 12. The detector 20 may detect movement of money removed from the withdrawal unit 12. In the case of removing money from the withdrawal unit 12, the money moves from the inside of the withdrawal unit 12 to the outside of the withdrawal unit 12. Thus, based on the movement of money removed from the withdrawal unit 12, it is confirmed that there is a possibility that part of money received by the withdrawal unit 12 has been removed from the withdrawal unit 12.

The removal action may include movement of an object entering the withdrawal unit 12. The detector 20 may detect movement of an object entering the withdrawal unit 12. In the case of removing money from the withdrawal unit 12, to remove the money from the withdrawal unit 12, an object (e.g., a hand of a person who is removing money) enters the withdrawal unit 12. Thus, based on movement of the object entering the withdrawal unit 12, it is confirmed that there is a possibility that part of money received by the withdrawal unit 12 has been removed from the withdrawal unit 12.

The removal action may include movement of a person in front of the money handling machine 1. The detector 20 may detect movement of a person in front of the money handling machine 1. In the case of removing money from the withdrawal unit 12, there is movement of a person who is to remove money in front of the money handling machine 1. Thus, based on the movement of a person in front of the money handling machine 1, it is confirmed that there is a possibility that part of money received by the withdrawal unit 12 has been removed from the withdrawal unit 12.

(Variation of Detector)

The detector 20 may be configured to detect an action associated with money removal from the withdrawal unit 12 and whether the money is present in the withdrawal unit 12 or not. With this configuration, the number of components of the money handling machine 1 can be reduced, as compared to a case where a detector for detecting an action associated with money removal from the withdrawal unit 12 and a detector for detecting whether the money is present in the withdrawal unit 12 or not are provided separately.

Second Embodiment

Figure 3:
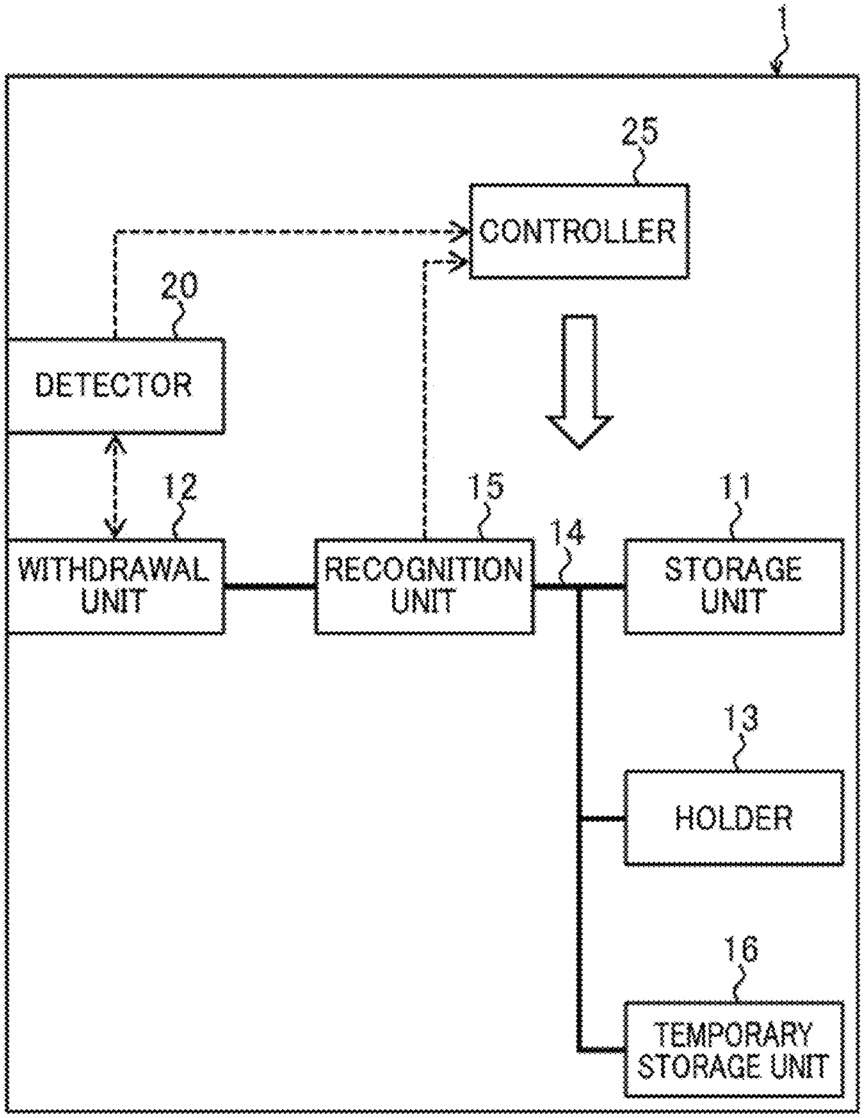
FIG. 3 is a block diagram illustrating a configuration of a money handling machine according to a second embodiment.

FIG. 3 illustrates an example configuration of a money handling machine 1 according to a second embodiment. The money handling machine 1 according to the second embodiment includes a recognition unit 15 and a temporary storage unit 16, in addition to the configuration of the money handling machine 1 according to the first embodiment illustrated in FIG. 1. The transport unit 14 according to the second embodiment transports money among the storage unit 11, the withdrawal unit 12, the holder 13, and the temporary storage unit 16. The other part of the configuration of the money handling machine 1 according to the second embodiment is similar to the configuration of the money handling machine 1 according to the first embodiment.

The recognition unit 15 recognizes money. Specifically, the recognition unit 15 recognizes, for example, serial numbers of money.

The temporary storage unit 16 stores money. In this example, the temporary storage unit 16 temporarily stores money.

In the second embodiment, money delivered from the storage unit 11 and received by the withdrawal unit 12 is recognized by the recognition unit 15. Specifically, the controller 25 controls an operation of the money handling machine 1 such that money delivered from the storage unit 11 is recognized by the recognition unit 15 and then transported to the withdrawal unit 12. Then, the controller 25 acquires a result of recognition by the recognition unit 15 performed on money delivered from the storage unit 11 and received by the withdrawal unit 12.

In the following description, in the controller 25, a result of recognition by the recognition unit 15 performed on money delivered from the storage unit 11 and received by the withdrawal unit 12 will be referred to as a "first recognition result." The first recognition result includes, for example, serial numbers of money.

[Process Performed in Money Handling Machine]

Figure 4:
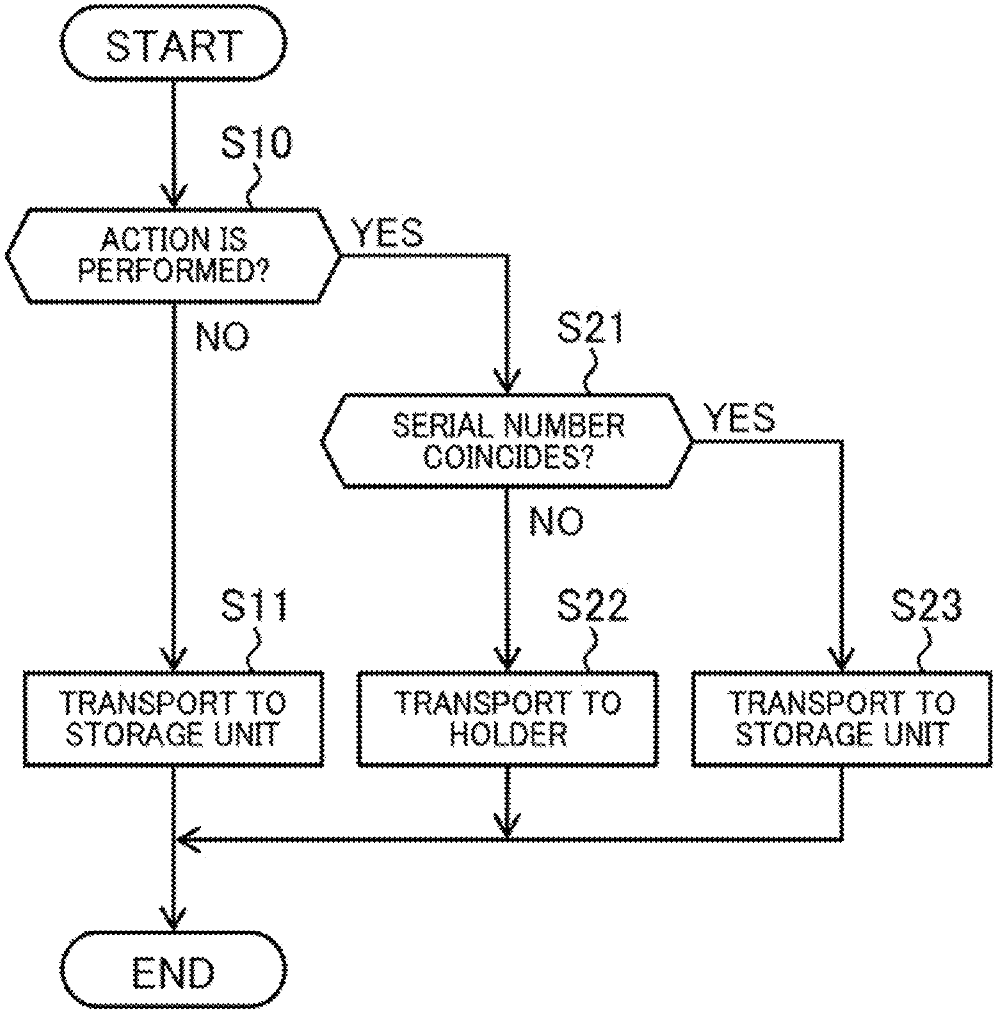
FIG. 4 is a flowchart depicting a money transport process according to the second embodiment.

Referring now to FIG. 4, a money transport process carried out in the money handling machine 1 according to the second embodiment will be described. In the money transport process according to the second embodiment, steps S21 through S23 are performed instead of step S12 shown in FIG. 2. The money transport process according to the second embodiment is different in the second process from the money transport process of the first embodiment.

<Step S21>

In the case of performing a removal action, the controller 25 controls an operation of the money handling machine 1 such that money remaining in the withdrawal unit 12 is recognized by the recognition unit 15. In this example, the controller 25 controls an operation of the money handling machine 1 such that money delivered from the withdrawal unit 12 is recognized by the recognition unit 15 and then transported to the temporary storage unit 16.

Then, the controller 25 acquires a result of recognition by the recognition unit 15 performed on money remaining in the withdrawal unit 12. In the following description, a result of recognition by the recognition unit 15 performed on money remaining in the withdrawal unit 12 will be referred to as a "second recognition result." The second recognition result includes, for example, serial numbers of money.

Next, the controller 25 determines whether serial numbers of money shown in the first recognition result coincide with serial numbers of money shown in the second recognition result. Specifically, if all the serial numbers of money shown in the first recognition result coincide with all the serial numbers of money shown in the second recognition result in a one-to-one correspondence, the controller 25 determines that the serial numbers of money shown in the first recognition result coincide with the serial numbers of money shown in the second recognition result.

If the serial numbers of money shown in the first recognition result coincide with the serial numbers of money shown in the second recognition result, step S23 is performed, and otherwise, step S22 is performed.

<Step S22>

If the serial numbers of money shown in the first recognition result do not coincide with the serial numbers of money shown in the second recognition result, the controller 25 controls an operation of the money handling machine 1 such that money remaining in the withdrawal unit 12 is transported to the holder 13. In this example, the controller 25 controls an operation of the money handling machine 1 such that money delivered from the temporary storage unit 16 is transported to the holder 13.

<Step S23>

On the other hand, if the serial numbers of money shown in the first recognition result coincide with the serial numbers of money shown in the second recognition result, the controller 25 controls an operation of the money handling machine 1 such that money remaining in the withdrawal unit 12 is transported to the storage unit 11. In this example, the controller 25 controls an operation of the money handling machine 1 such that money delivered from the temporary storage unit 16 is transported to the storage unit 11.

[Advantages of Second Embodiment]

As described above, in the second embodiment, the controller 25 controls an operation of the money handling machine 1 in the second process such that if the serial numbers of money shown in the first recognition result that is a result of recognition by the recognition unit 15 performed on money delivered from the storage unit 11 and received by the withdrawal unit 12 do not coincide with the serial numbers of money shown in the second recognition result that is a result of recognition by the recognition unit 15 performed on money remaining in the withdrawal unit 12, money remaining in the withdrawal unit 12 is transported to the holder 13. In the second process, the controller 25 controls an operation of the money handling machine 1 such that if the serial numbers of money shown in the first recognition result coincide with the serial numbers of money shown in the second recognition result, money remaining in the withdrawal unit 12 is transported to the storage unit 11.

Even in a case where an action associated with money removal from the withdrawal unit 12 is confirmed, if the serial numbers of money received by the withdrawal unit 12 coincide with the serial numbers of money remaining in the withdrawal unit 12, part of money received by the withdrawal unit 12 is less likely to be removed from the withdrawal unit 12.

Thus, in the second process, if the serial numbers of money shown in the first recognition result coincide with the serial numbers of money shown in the second recognition result, money remaining in the withdrawal unit 12 is transported to the storage unit 11 different from the holder 13.

Accordingly, it is possible to prevent or reduce the use of holder 13 more than necessary.

Third Embodiment

Figure 5:
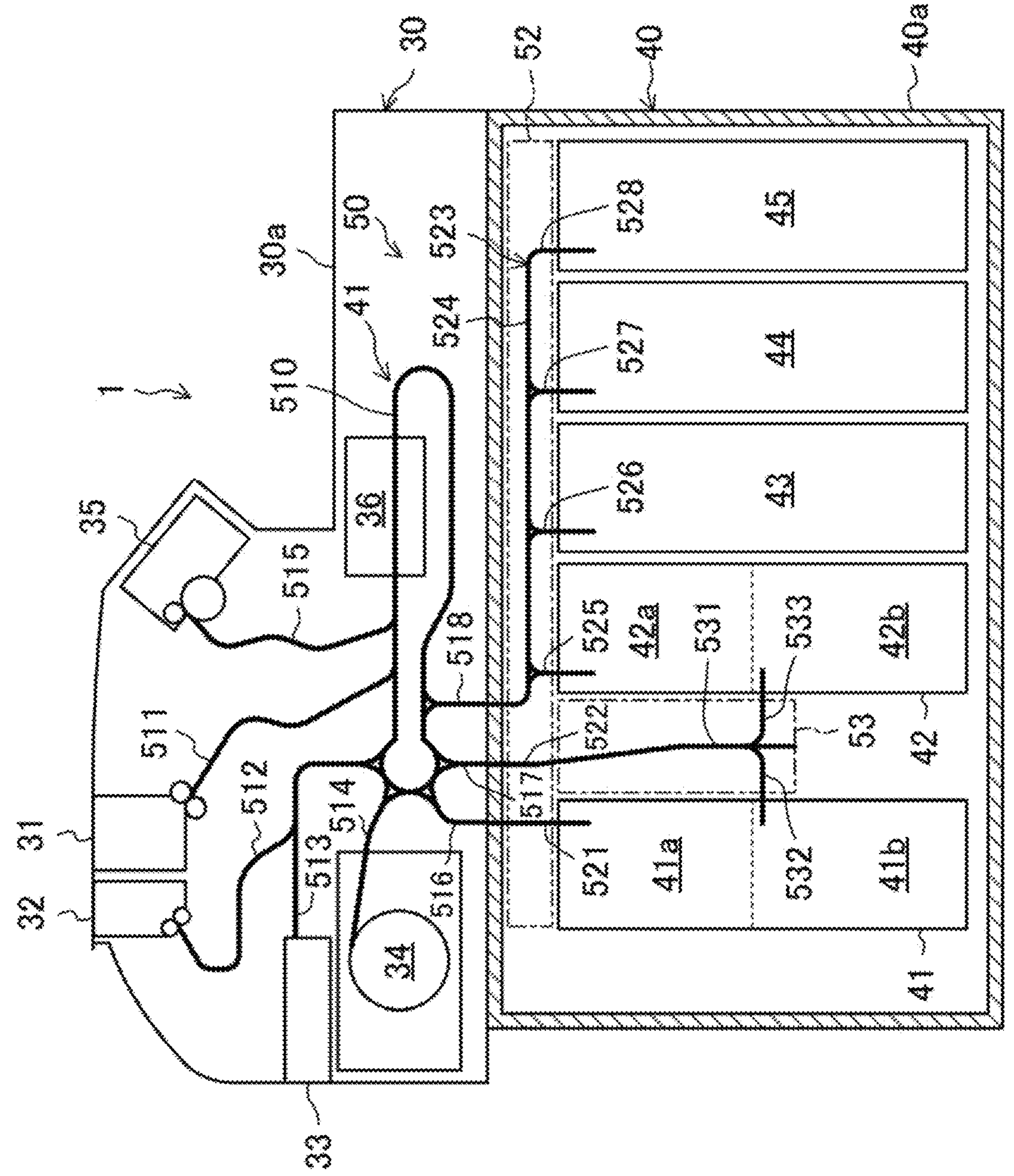
FIG. 5 illustrates a configuration of a money handling machine according to a third embodiment.

FIG. 5 illustrates an example configuration of a money handling machine 1 according to a third embodiment. The money handling machine 1 according to the third embodiment is an example configuration of the money handling machines 1 according to the first and second embodiments.

Directions (front, rear, up, and down) used herein correspond to directions when the money handling machine 1 placed on a horizontal plane is seen from the front. The front side of the money handling machine 1 is a side in which a deposit unit 31 and a withdrawal unit 32 are formed, and a rear side of the money handling machine 1 is a side opposite to the side in which the deposit unit 31 and the withdrawal unit 32 are formed.

In the third embodiment, the money handling machine 1 constitutes a banknote processing machine for processing banknotes. Specifically, the money handling machine 1 including a processor 30, a safe 40, and a transport unit 50. The money handling machine 1 performs various processes including a deposit process and a withdrawal process. For example, the money handling machine 1 is installed in a financial institution such as a bank. The transport unit 50 is an example of the transport units 14 of the first and second embodiments.

[Processor]

The processor 30 constitutes an upper portion of the money handling machine 1. The processor 30 includes a processing casing 30*a*. The processing casing 30*a* houses the deposit unit 31, the withdrawal unit 32, a rejection unit 33, a temporary storage unit 34, a retraction unit 35, and a recognition unit 36.

The withdrawal unit 32 is an example of the withdrawal units 12 of the first and second embodiments. The temporary storage unit 34 is an example of the temporary storage unit 16 of the second embodiment. The retraction unit 35 is an example of the holders 13 of the first and second embodiments. The recognition unit 36 is an example of the recognition unit 15 of the second embodiment.

<Deposit Unit>

The deposit unit 31 receives banknotes. The deposit unit 31 is disposed in an upper front portion of the processor 30. The deposit unit 31 has a deposit port that is open upward. An operator places banknotes in the deposit unit 31 through the deposit port. The deposit unit 31 can hold a stack of banknotes. The deposit unit 31 includes a feed mechanism that feeds banknotes in the deposit unit 31 to a processing-side transport unit 51 one by one.

<Withdrawal Unit>

Figure 6:
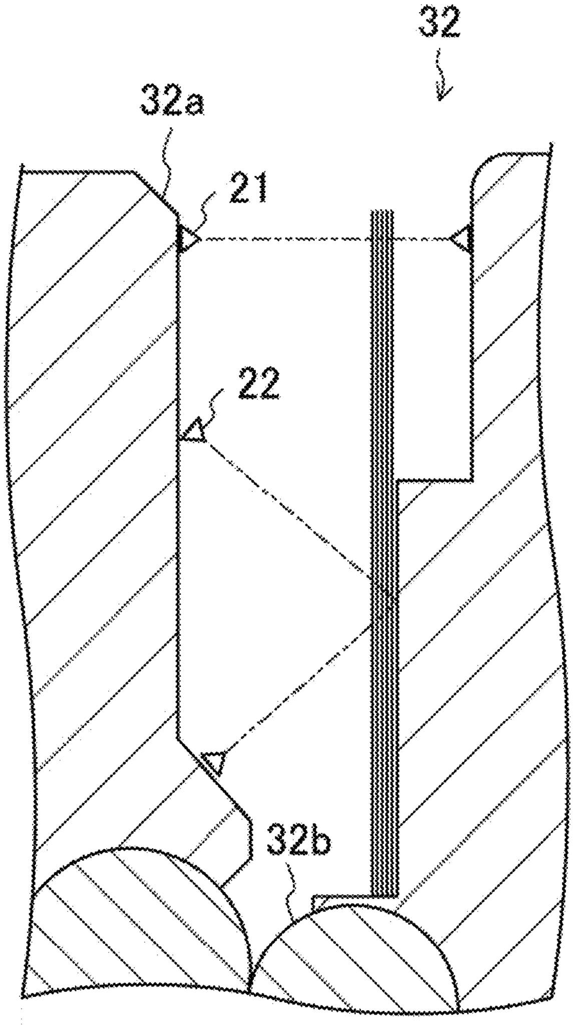
FIG. 6 illustrates a configuration of a withdrawal unit according to the third embodiment.

The withdrawal unit 32 feeds out banknotes. The withdrawal unit 32 is disposed forward of the deposit unit 31 in the upper front portion of the processor 30. The withdrawal unit 32 can hold a stack of banknotes. As illustrated in FIG. 6, the withdrawal unit 32 has a withdrawal port 32*a* that is open upward. The operator can take out banknotes accumulated in the withdrawal unit 32 through the withdrawal port 32*a* by hand. The withdrawal unit 32 may include a shutter for opening and closing the withdrawal port 32*a*.

The withdrawal unit 32 includes a feed in/out mechanism 32*b*. The feed in/out mechanism 32*b* receives banknotes from the processing-side transport unit 51 into the withdrawal unit 32 one by one. The feed in/out mechanism 32*b* feeds banknotes from the inside of the withdrawal unit 32 to the processing-side transport unit 51 one by one.

<Rejection Unit>

The rejection unit 33 accumulates banknotes as a target to be rejected. The rejection unit 33 is disposed below the withdrawal unit 32 in a front portion of the processor 30. The rejection unit 33 can hold a stack of banknotes. The rejection unit 33 has a reject port that is open forward. The rejection unit 33 includes a shutter for opening and closing the reject port. When the shutter is opened, the operator can remove banknotes accumulated in the rejection unit 33 through the reject port by hand.

The rejection unit 33 includes a feed in/out mechanism. The feed in/out mechanism receives banknotes from the processing-side transport unit 51 into the rejection unit 33 one by one. The feed in/out mechanism feeds banknotes from the inside of the rejection unit 33 to the processing-side transport unit 51 one by one.

<Temporary Storage Unit>

The temporary storage unit 34 stores banknotes. The temporary storage unit 34 feeds banknotes stored therein. The temporary storage unit 34 is disposed below the rejection unit 33 in a front portion of the processor 30. The configuration of the temporary storage unit 34 can employ a known configuration of a storage unit that stores and feeds banknotes. In this example, the temporary storage unit 34 is a tape-type storage unit. The tape-type storage unit stores banknotes by winding banknotes around a drum together with a tape. The temporary storage unit 34 may be a stack-type storage unit. The stack-type storage unit stores a stack of banknotes.

<Retraction Unit>

The retraction unit 35 stores banknotes. The configuration of the retraction unit 35 can employ a known configuration of a storage unit that stores banknotes. For example, the retraction unit 35 has a retraction port communicating with the inside of the retraction unit 35. The retraction unit 35 includes a shutter for opening and closing the retraction port. When the shutter is opened, the operator can remove banknotes accumulated in the retraction unit 35 through the retraction port by hand. The shutter of the retraction unit 35 may be configured to be opened only by an operator having predetermined authority (e.g., bank clerk).

<Recognition Unit>

The recognition unit 36 recognizes banknotes. Specifically, the recognition unit 36 is provided in the processing-side transport unit 51 described later, and performs recognition on banknotes transported by the processing-side transport unit 51. In the recognition, the recognition unit 36 recognizes denomination, fitness, new or old, authenticity, transport state, and serial numbers of banknotes, for example. For example, the recognition unit 36 includes sensors such as a line sensor, a magnetic sensor, and an image sensor, a processor, and a memory that stores programs and data for operating the processor. A result of recognition of banknotes by the recognition unit 36 is transmitted to the controller 25.

[Safe]

The safe 40 includes a safe casing 40*a*. The safe casing 40*a* stores first through fifth storage units 41 through 45. The first through fifth storage units 41 through 45 are an example of the storage units 11 of the first and second embodiments.

A security level of the safe casing 40*a* is higher than a security level of the processing casing 10*a*. Specifically, the safe casing 40*a* is formed of a metal plate having a predetermined thickness or more, and protects, for example, the first through fifth storage units 41 through 45 at a security level of a predetermined level or more.

For example, the safe casing 40*a* includes a door configured to be opened and closed, and an electronic lock is attached to the door. When the operator (e.g., bank clerk) unlocks the electronic lock and opens the door, the operator can access the first through fifth storage units 41 through 45 disposed inside the safe casing 40*a*.

<Storage Unit>

Each of the first through fifth storage units 41 through 45 stores banknotes. Each of the first through fifth storage units 41 through 45 feeds stored banknotes. The first through fifth storage units 41 through 45 are arranged in the front-rear direction. The configuration of each of the first through fifth storage units 41 through 45 can employ a known configuration of a storage unit that stores and feeds banknotes. For example, the first through fifth storage units 41 through 45 are stack-type storage units.

In this example, the first storage unit 41 includes a first storage region 41*a* and a second storage region 41*b* that are independent of each other. The first storage unit 41 stores and feeds banknotes in the first storage region 41*a*, and stores and feeds banknotes in the second storage region 41*b*.

In a manner similar to the first storage unit 41, the second storage unit 42 includes a first storage region 42*a* and a second storage region 42*b* that are independent of each other. The second storage unit 42 stores and feeds banknotes in the first storage region 42*a*, and stores and feeds banknotes in the second storage region 42*b*.

[Transport Unit]

The transport unit 50 transports banknotes in the money handling machine 1. The transport unit 50 includes the processing-side transport unit 51, a first safe-side transport unit 52, and a second safe-side transport unit 53.

The processing-side transport unit 51 is housed in the processing casing 30*a*. The processing-side transport unit 51 transports banknotes in the processor 30. The first safe-side transport unit 52 and the second safe-side transport unit 53 are housed in the safe casing 40*a*. The first safe-side transport unit 52 and the second safe-side transport unit 53 transport banknotes in the safe 40.

The processing-side transport unit 51, the first safe-side transport unit 52, and the second safe-side transport unit 53 include transport paths. The transport paths include, for example, a transport mechanism for transporting banknotes, a guide member for guiding banknotes under transport, a branch mechanism for switching a transport direction of banknotes, and a driving mechanism for driving the transport mechanism and the branch mechanism. Examples of the transport mechanism include a roller and a belt. Examples of the branch mechanism include a branch pawl provided at a branch portion of the transport path. Examples of the driving mechanism include a motor and a gear.

The transport paths of the processing-side transport unit 51, the first safe-side transport unit 52, and the second safe-side transport unit 53 will now be specifically described.

[Processing-Side Transport Unit]

The processing-side transport unit 51 includes a ring-shaped path 510 and first through eighth transport paths 511 through 518.

The ring-shaped path 510 is formed in a ring shape. The ring-shaped path 510 can transport banknotes both clockwise and counterclockwise in FIG. 5.

The first transport path 511 connects the ring-shaped path 510 to the deposit unit 31. The first transport path 511 transports banknotes between the ring-shaped path 510 and the deposit unit 31.

The second transport path 512 connects the ring-shaped path 510 to the withdrawal unit 32. The second transport path 512 transports banknotes between the ring-shaped path 510 and the withdrawal unit 32.

The third transport path 513 connects the ring-shaped path 510 to the rejection unit 33. The third transport path 513 transports banknotes between the ring-shaped path 510 and the rejection unit 33. In this example, the third transport path 513 is partially shared by the second transport path 512.

The fourth transport path 514 connects the ring-shaped path 510 to the temporary storage unit 34. The fourth transport path 514 conveys banknotes between the ring-shaped path 510 and the temporary storage unit 34.

The fifth transport path 515 connects the ring-shaped path 510 to the retraction unit 35. The fifth transport path 515 transports banknotes between the ring-shaped path 510 and the retraction unit 35.

The sixth transport path 516 connects the ring-shaped path 510 to a first transport path 521 of the first safe-side transport unit 52. The sixth transport path 516 transports banknotes between the ring-shaped path 510 and the first transport path 521 of the first safe-side transport unit 52.

The seventh transport path 517 connects the ring-shaped path 510 to a second transport path 522 of the first safe-side transport unit 52. The seventh transport path 517 conveys banknotes between the ring-shaped path 510 and the second transport path 522 of the first safe-side transport unit 52.

The eighth transport path 518 connects the ring-shaped path 510 to a third transport path 523 of the first safe-side transport unit 52. The eighth transport path 518 transports banknotes between the ring-shaped path 510 and the third transport path 523 of the first safe-side transport unit 52.

[First Safe-Side Transport Unit]

The first safe-side transport unit 52 includes the first transport path 521, the second transport path 522, and the third transport path 523.

The first transport path 521 connects the sixth transport path 516 of the processing-side transport unit 51 to the first storage region 41*a* of the first storage unit 41. The first transport path 521 transports banknotes between the sixth transport path 516 of the processing-side transport unit 51 and the first storage region 41*a* of the first storage unit 41.

The second transport path 522 connects the sixth transport path 516 of the processing-side transport unit 51 to a first transport path 531 of the second safe-side transport unit 53 described later. The second transport path 522 transports banknotes between the sixth transport path 516 of the processing-side transport unit 51 and the first transport path 531 of the second safe-side transport unit 53.

The third transport path 523 transports banknotes among the eighth transport path 518 of the processing-side transport unit 51, the first storage region 42*a* of the second storage unit 42, and the third through fifth storage units 43 through 45. The third transport path 523 includes a main path 524 and first through fourth branch paths 525 through 528. The main path 524 is connected to the eighth transport path 518 of the processing-side transport unit 51. The first branch path 525 connects the main path 524 to the first storage region 42*a* of the second storage unit 42. The second branch path 526 connects the main path 524 to the third storage unit 43. The third branch path 527 connects the main path 524 to the fourth storage unit 44. The fourth branch path 528 connects the main path 524 to the fifth storage unit 45.

[Second Safe-Side Transport Unit]

The second safe-side transport unit 53 includes the first transport path 531, a second transport path 532, and a third transport path 533.

The first transport path 531 is connected to the second transport path 522 of the first safe-side transport unit 52.

The second transport path 532 connects the first transport path 531 to the second storage region 41*b* of the first storage unit 41. The second transport path 532 transports banknotes between the first transport path 531 and the second storage region 41*b* of the first storage unit 41.

The third transport path 533 connects the first transport path 531 to the second storage region 42*b* of the second storage unit 42. The third transport path 533 transports banknotes between the first transport path 531 and the second storage region 42*b* of the second storage unit 42.

[Sensors]

The money handling machine 1 includes various sensors such as a passage sensor for detecting passage of a banknote. Information obtained by these sensors is transmitted to the controller 25. In this example, the money handling machine 1 includes a first detector 21 and a second detector 22. The first detector 21 and the second detector 22 are an example of the detectors 20 of the first and second embodiments.

<First Detector>

The first detector 21 detects an action associated with removal of a banknote from the withdrawal unit 32. In this example, the first detector 21 detects movement of a banknote removed from the withdrawal unit 32. The first detector 21 also detects movement of an object entering the withdrawal unit 32.

As illustrated in FIG. 6, the first detector 21 includes a transmitter that transmits light and a receiver that receives light from the transmitter. The transmitter and the receiver are disposed such that when an object (specifically a hand of a person) enters the withdrawal unit 32 and removes a banknote from the withdrawal unit 32, light emitted from the transmitter toward the receiver is blocked by the banknote or the object The first detector 21 detects "movement of a banknote removed from the withdrawal unit 32" or "movement of the object entering the withdrawal unit 32" by blocking of light emitted from the transmitter toward the receiver.

<Second Detector>

The second detector 22 detects whether a banknote is present in the withdrawal unit 32 or not.

As illustrated in FIG. 6, in a manner similar to the first detector 21, the second detector 22 includes a transmitter that transmits light and a receiver that receives light from the transmitter. The transmitter and the receiver are disposed such that in a case where the banknote is present in the withdrawal unit 32, light emitted from the transmitter toward the receiver is blocked by the banknote. The second detector 22 detects the presence of a banknote in the withdrawal unit 32 by blocking of light emitted from the transmitter toward the receiver.

[Operation Unit, Memory Unit, Communicator]

Figure 7:
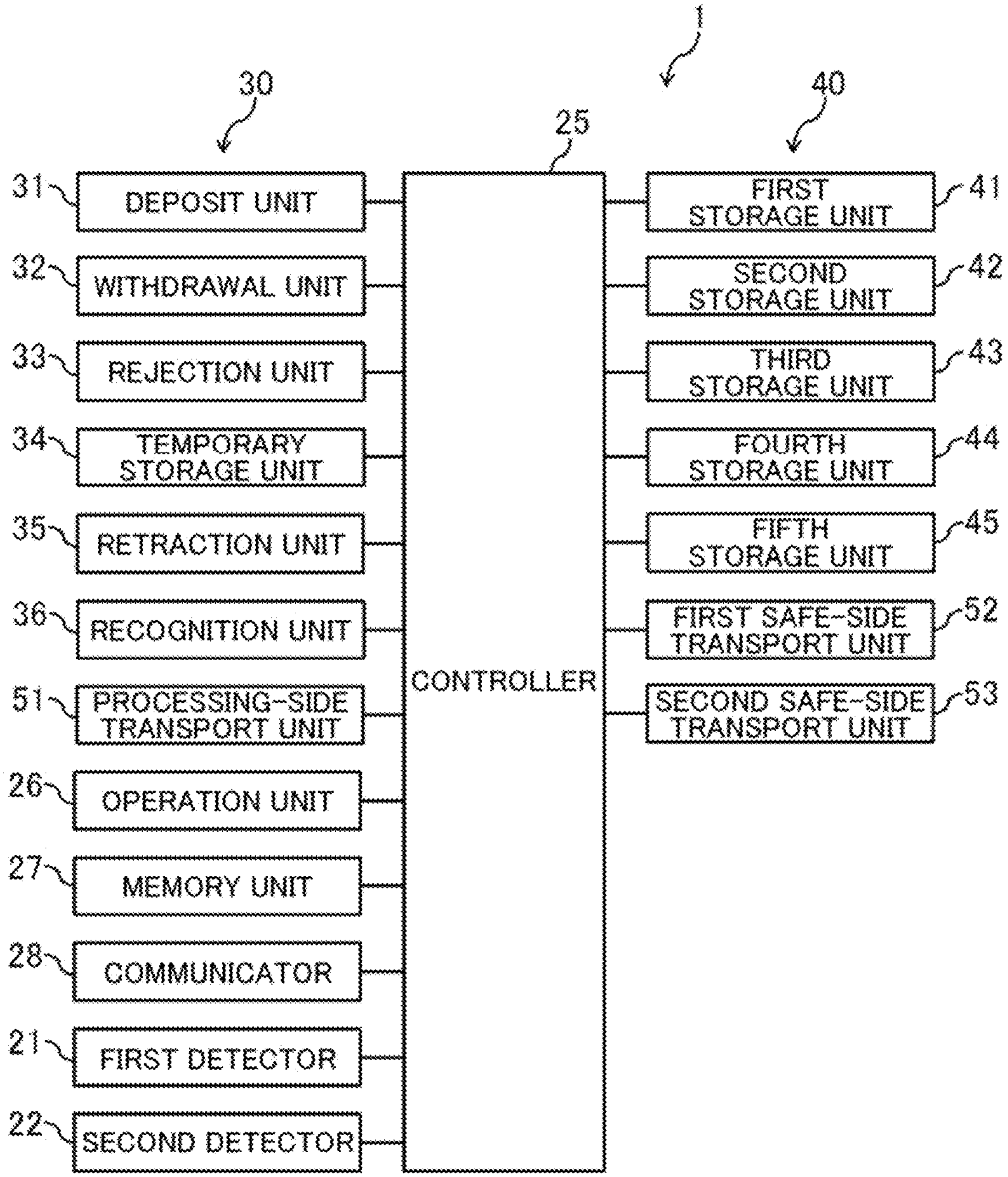
FIG. 7 is a block diagram illustrating a configuration of a money handling machine according to the third embodiment.

As illustrated in FIG. 7, the money handling machine 1 according to the third embodiment includes an operation unit 26, a memory unit 27, and a communicator 28.

The operation unit 26 receives a manipulation by an operator and outputs a signal in response to the manipulation. This configuration enables the operator to manipulate the operation unit 26 and input information and an instruction to the money handling machine 1.

The memory unit 27 stores various types of information. For example, the memory unit 27 stores, for example, information on an inventory of banknotes in the money handling machine 1, and information for use in control of components of the money handling machine 1. Examples of the information for use in control of components of the money handling machine 1 include values detected by sensors and thresholds for use in control of the components. The memory unit 27 may be an external storage disposed outside the controller 25.

The communicator 28 is provided to allow the controller 25 to perform wired communication or wireless communication with external equipment. Examples of the external equipment include a tablet, a smartphone, and a management computer.

[Controller]

As illustrated in FIG. 7, the controller 25 of the third embodiment is connected to components of the money handling machine 1. The controller 25 can communicate with external equipment via the communicator 28 The controller 25 controls components of the money handling machine 1 to control an operation of the money handling machine 1 based on a manipulation input to the operation unit 26, signals and information sent from components of the money handling machine 1 (including sensors provided in the components) and external equipment, for example. The controller 25 includes a processor, and a memory that stores programs and data for operating the processor. Control and determination by the controller 25 are performed by execution of a program by the processor. The program and data for operating the processor may be stored in the memory unit 27.

In the money handling machine 1 according to the third embodiment, a withdrawal process, a withdrawal banknote transport process, a withdrawal fraud determination process, a deposit process, a deposit banknote transport process, and a deposit fraud determination process are performed.

[Withdrawal Process]

The withdrawal process is a process for withdrawing banknotes from the money handling machine 1.

When a manipulation indicating execution of the withdrawal process is input to the operation unit 26, the controller 25 controls an operation of the money handling machine 1 to perform a withdrawal process.

In the withdrawal process, banknotes delivered from a storage unit as a target of the withdrawal process in the first through fifth storage units 41 through 45 are transported to the recognition unit 36 via the first safe-side transport unit 52 and the processing-side transport unit 51, and recognized by the recognition unit 36. If the banknotes recognized by the recognition unit 36 are a target to be rejected, the banknotes are transported to the temporary storage unit 34. On the other hand, if the banknotes recognized by the recognition unit 36 are not a target to be rejected, the banknotes are transported to the withdrawal unit 32.

When the withdrawal process is finished, an operator removes banknotes accumulated in the withdrawal unit 32 by hand through the withdrawal port 32*a*. The banknotes as a target to be rejected housed in the temporary storage unit 34 are transported to one of the first through fifth storage units 41 through 45.

The controller 25 acquires a result of recognition by the recognition unit 36 performed on banknotes delivered from the storage unit as a target of the withdrawal process and received by the withdrawal unit 32. A result of recognition by the recognition unit 36 performed on banknotes delivered from the storage unit as a target of the withdrawal process and received by the withdrawal unit 32 will be hereinafter referred as a "withdrawal recognition result." The withdrawal recognition result includes serial numbers of banknotes and a total amount of banknotes. The withdrawal recognition result is an example of the first recognition result of the second embodiment.

[Withdrawal Banknote Transport Process]

The withdrawal banknote transport process is performed in a case where banknotes remain in the withdrawal unit 32 after the withdrawal process is completed. The withdrawal banknote transport process is a process for transporting banknotes remaining in the withdrawal unit 32. Specifically, the withdrawal banknote transport process is performed in a case where one or more banknotes remain in the withdrawal unit 32 after a lapse of a predetermined time from when transport of banknotes from a storage unit as a target of the withdrawal process in the first through fifth storage units 41 through 45 to the withdrawal unit 32 is completed.

The withdrawal banknote transport process of the third embodiment is similar to the money transport process of the first embodiment shown in FIG. 2 or the money transport process of the second embodiment shown in FIG. 4. The withdrawal banknote transport process is an example of the money transport processes of the first and second embodiments.

For example, in the withdrawal banknote transport process, the "first through fifth storage units 41 through 45" correspond to the "storage unit 11" in the first and second embodiments, the "retraction unit 35" corresponds to the "holder 13" of the first and second embodiments, the "first detector 21 and the second detector 22" correspond to the "detector 20" of the first and second embodiments, the "recognition unit 36" corresponds to the "recognition unit 15" of the second embodiment, and the "temporary storage unit 34" corresponds to the "temporary storage unit 16" of the second embodiment.

[Withdrawal Fraud Determination Process]

The withdrawal fraud determination process is a process for determining whether removal of banknotes from the withdrawal unit 32 after the withdrawal process is suspected to be fraudulent or not. The "fraudulent (fraud)" means that part of the banknotes received by the withdrawal unit 32 has been removed but the other part of the banknotes remain in the withdrawal unit 32.

Figure 8:
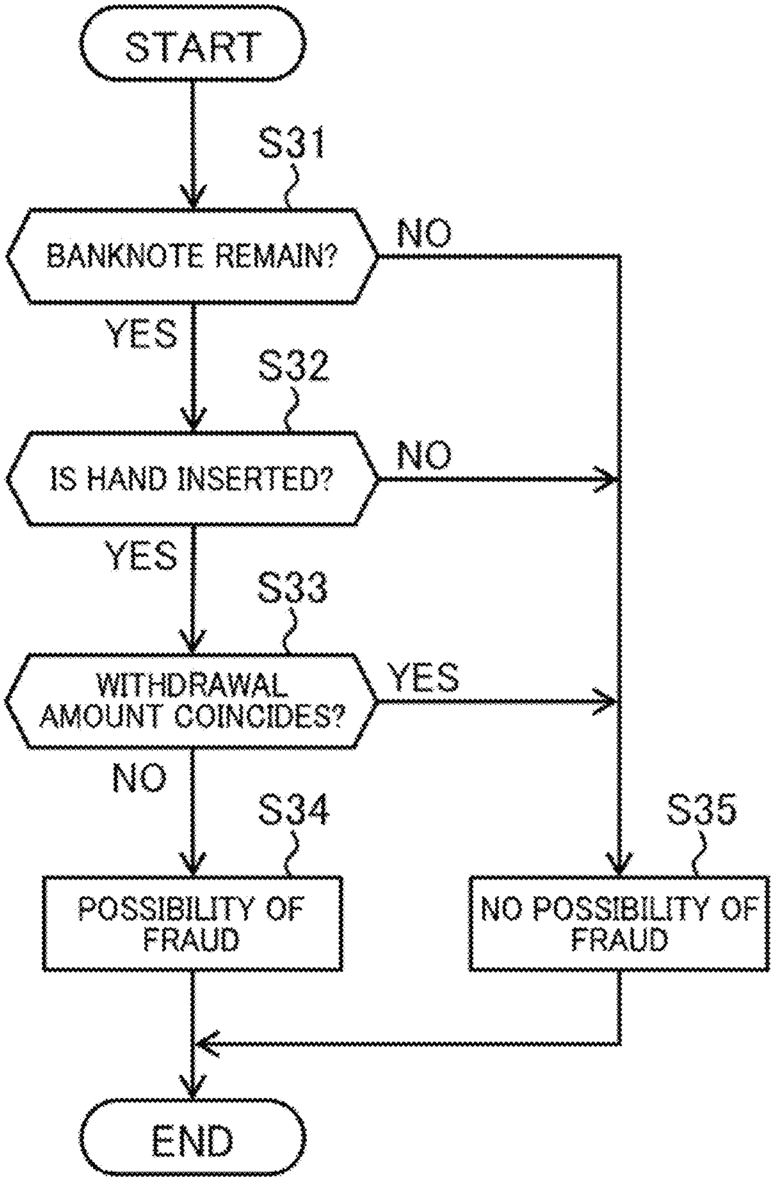
FIG. 8 is a flowchart depicting a withdrawal fraud determination process according to the third embodiment.

Referring now to FIG. 8, the withdrawal fraud determination process will be described. The withdrawal fraud determination process is performed after the withdrawal process is completed. For example, the withdrawal fraud determination process is performed after a lapse of a predetermined time from when transport of banknotes from a storage unit as a target of the withdrawal process in the first through fifth storage units 41 through 45 is completed in the withdrawal process.

<Step S31>

The controller 25 determines whether one or more banknotes remain in the withdrawal unit 32 or not. Specifically, the controller 25 determines whether one or more banknotes are present in the withdrawal unit 32 or not, based on a detection result of the second detector 22. If one or more banknotes are present in the withdrawal unit 32, the controller 25 determines that one or more banknotes remain in the withdrawal unit 32. If one or more banknotes are present in the withdrawal unit 32, step S32 is performed, and otherwise, step S35 is performed.

<Step S32>

If one or more banknotes remain in the withdrawal unit 32, the controller 25 determines whether a hand of an operator is inserted in the withdrawal unit 32 or not. Specifically, the controller 25 detects the presence of movement of an object entering the withdrawal unit 32 based on a detection result of the first detector 21. If there is movement of an object entering the withdrawal unit 32, the controller 25 determines that a hand of the operator is inserted in the withdrawal unit 32. If the hand of the operator is inserted in the withdrawal unit 32, step S33 is performed, and otherwise, step S35 is performed.

<Step S33>

In a case where one or more banknotes remain in the withdrawal unit 32 and a hand of an operator is inserted in the withdrawal unit 32, the controller 25 controls an operation of the money handling machine 1 such that banknote remaining in the withdrawal unit 32 is recognized by the recognition unit 36. In this example, the controller 25 controls an operation of the money handling machine 1 such that banknote delivered from the withdrawal unit 32 is recognized by the recognition unit 36 and then transported to the temporary storage unit 34.

Then, the controller 25 acquires a result of recognition by the recognition unit 36 performed on banknote remaining in the withdrawal unit 32. A result of recognition by the recognition unit 36 performed on banknote remaining in the withdrawal unit 32 will be hereinafter referred to as a "remaining recognition result." The remaining recognition result includes serial numbers of banknotes and a total amount of banknotes. The remaining recognition result is an example of the second recognition result of the second embodiment.

Next, the controller 25 determines whether a total amount of banknote shown in the withdrawal recognition result is equal to a total amount of banknote shown in the remaining recognition result or not. If the total amount of banknote shown in the withdrawal recognition result is equal to the total amount of banknote shown in the remaining recognition result, step S34 is performed, and otherwise, step S35 is performed.

<Step S34>

If one or more banknotes remain in the withdrawal unit 32, a hand of an operator is inserted in the withdrawal unit 32, and the total amount of banknote shown in the withdrawal recognition result is not equal to the total amount of banknote shown in the remaining recognition result, the controller 25 determines that removal of banknotes from the withdrawal unit 32 after the withdrawal process is suspected to be fraudulent.

Then, the controller 25 stores, in the memory unit 27, determination result information showing that removal of banknotes from the withdrawal unit 32 after the withdrawal process is suspected to be fraudulent. The determination result information includes information for specifying a withdrawal process suspected to be fraudulent, information indicating a total amount of banknotes withdrawn in the withdrawal process, information indicating the presence of one or more banknotes remaining in the withdrawal unit 32, and information indicating that a hand of an operator is inserted in the withdrawal unit 32, in addition to the information indicating a suspicion of fraud.

<Step S35>

On the other hand, if no banknotes remain in the withdrawal unit 32, if a hand of an operator is not inserted in the withdrawal unit 32, or if the total amount of banknote shown in the withdrawal recognition result is equal to the total amount of banknote shown in the remaining recognition result, the controller 25 determines that removal of banknotes from the withdrawal unit 32 after the withdrawal process is not suspected to be fraudulent.

The controller 25 stores, in the memory unit 27, determination result information showing that removal of banknotes from the withdrawal unit 32 after the withdrawal process is not suspected to be fraudulent. The determination result information includes information for specifying a withdrawal process not suspected to be fraudulent, information indicating the total amount of banknotes withdrawn in the withdrawal process, information indicating whether one or more banknotes remain in the withdrawal unit 32 or not, and information indicating whether a hand of an operator is inserted in the withdrawal unit 32 or not, in addition to the information indicating no suspicion of fraud.

[Deposit Process]

The deposit process is a process for depositing one or more banknotes in the money handling machine 1.

When a manipulation instructing execution of a deposit process is input to the operation unit 26, the controller 25 controls an operation of the money handling machine 1 such that the deposit process is performed.

In the deposit process, one or more banknotes supplied to the deposit unit 31 are delivered from the deposit unit 31 to the processing-side transport unit 51, transported to the recognition unit 36 via the processing-side transport unit 51, and recognized by the recognition unit 36. If banknotes recognized by the recognition unit 36 are a target to be rejected, the banknotes are transported to the rejection unit 33. On the other hand, if the banknotes recognized by the recognition unit 36 are not a target to be rejected, the banknotes are transported to the temporary storage unit 34.

Thereafter, when a manipulation of approving a deposit of one or more banknotes is input to the operation unit 26, banknotes stored in the temporary storage unit 34 are delivered to the processing-side transport unit 51. The banknotes delivered to the processing-side transport unit 51 are conveyed to one of the first through fifth storage units 41 through 45 via the processing-side transport unit 51 and the first safe-side transport unit 52, depending on a recognition result of banknotes by the recognition unit 36.

On the other hand, when a manipulation of canceling a deposit of one or more banknotes is input to the operation unit 26, banknotes stored in the temporary storage unit 34 are transported to the withdrawal unit 32 and returned from the withdrawal unit 32.

When the deposit process is completed, an operator removes banknotes accumulated in the rejection unit 33 through the reject port by hand.

[Deposit Banknote Transport Process]

The deposit banknote transport process is performed in a case where one or more banknotes remain in the rejection unit 33 after the deposit process is completed. The deposit banknote transport process is a process for transporting banknotes remaining in the rejection unit 33. Specifically, the deposit banknote transport process is performed in a case where one or more banknotes remain in the rejection unit 33 after a lapse of a predetermined time from when a "manipulation of approving a deposit of banknotes" or a "manipulation of canceling a deposit of banknotes" is input to the operation unit 26 in the deposit process.

In the deposit banknote transport process of the third embodiment, the controller 25 performs an operation of the money handling machine 1 such that banknotes remaining in the rejection unit 33 are transported to the retraction unit 35.

[Deposit Fraud Determination Process]

The deposit fraud determination process is a process for determining whether removal of banknotes from the rejection unit 33 after the deposit process is suspected to be fraudulent or not. The "fraudulent (fraud)" means that part of banknotes received by the rejection unit 33 has been removed but the other part of the banknotes remains in the rejection unit 33.

Figure 9:
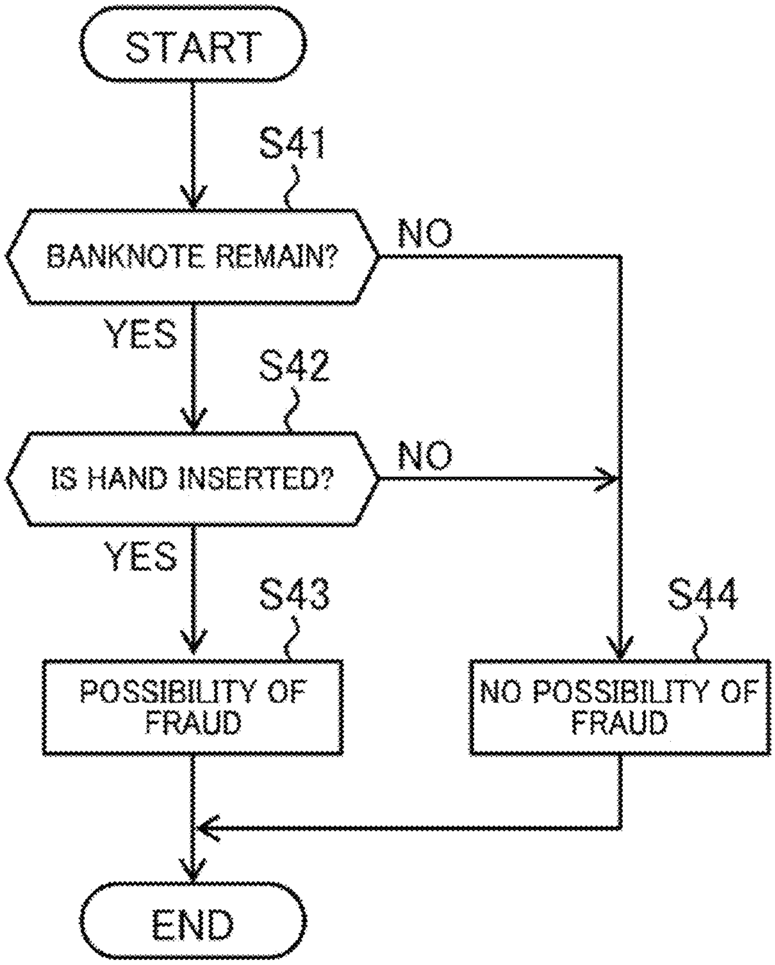
FIG. 9 is a flowchart depicting a deposit fraud determination process according to the third embodiment.

Referring now to FIG. 9, the deposit fraud determination process will be described. The deposit fraud determination process is performed after the deposit process is completed. For example, the deposit banknote transport process is performed after a lapse of a predetermined time from when a "manipulation of approving a deposit of banknotes" or a "manipulation of canceling a deposit of banknotes" is input to the operation unit 26 in the deposit process.

In the following description, the case of providing a third detector for detecting an action associated with removal of banknotes in the rejection unit 33 and a fourth detector for detecting whether banknotes are present in the rejection unit 33 or not will be described as an example. The configuration of the third detector is similar to the configuration of the first detector 21, and the configuration of the fourth detector is similar to the configuration of the second detector 22.

<Step S41>

The controller 25 determines whether one or more banknotes remain in the rejection unit 33 or not. Specifically, the controller 25 determines whether one or more banknotes are present in the rejection unit 33 or not, based on a detection result of the fourth detector. If one or more banknotes are present in the rejection unit 33, the controller 25 determines that one or more banknotes remain in the rejection unit 33. If one or more banknotes remain in the rejection unit 33, step S42 is performed, and otherwise, step S44 is performed.

<Step S42>

If one or more banknotes remain in the rejection unit 33, the controller 25 determines whether a hand of an operator is inserted in the rejection unit 33 or not. For example, the controller 25 detects the presence of movement of an object entering the rejection unit 33 based on a detection result of the third detector. If there is movement of an object entering the rejection unit 33, the controller 25 determines that a hand of the operator is inserted in the rejection unit 33. If the hand of the operator is inserted in the rejection unit 33, step S43 is performed, and otherwise, step S44 is performed.

<Step S43>

If one or more banknotes remain in the rejection unit 33 and a hand of an operator is inserted in the rejection unit 33, the controller 25 determines that removal of banknotes from the rejection unit 33 after the deposit process is suspected to be fraudulent.

The controller 25 stores, in the memory unit 27, determination result information showing that removal of banknotes from the rejection unit 33 after the deposit process is suspected to be fraudulent. The determination result information includes information for specifying a deposit process suspected to be fraudulent, information indicating a total amount of banknotes deposited in the deposit process, information indicating the presence of one or more banknotes remaining in the rejection unit 33, and information indicating that a hand of an operator is inserted in the rejection unit 33, in addition to the information indicating a suspicion of fraud.

<Step S44>

On the other hand, if no banknotes remain in the rejection unit 33 or if a hand of an operator is not inserted in the rejection unit 33, the controller 25 determines that removal of banknotes from the rejection unit 33 after the deposit process is not suspected to be fraudulent.

The controller 25 stores, in the memory unit 27, determination result information showing that removal of banknotes from the rejection unit 33 after the deposit process is not suspected to be fraudulent. The determination result information includes information for specifying a deposit process not suspected to be fraudulent, information indicating the total amount of banknotes deposited in the deposit process, information indicating whether one or more banknotes remain in the rejection unit 33 or not, and information indicating whether a hand of an operator is inserted in the rejection unit 33 or not, in addition to the information indicating no suspicion of fraud.

[Advantages of Third Embodiment]

The money handling machine 1 according to the third embodiment can obtain advantages similar to those of the money handling machines 1 according to the first and second embodiments. For example, banknotes remaining in the withdrawal unit 32 can be appropriately processed.

In the third embodiment, the withdrawal fraud determination process is performed so that it is possible to determine whether removal of banknotes from the withdrawal unit 32 after the withdrawal process is suspected to be fraudulent or not.

In the third embodiment, the deposit fraud determination process is performed so that it is possible to determine whether removal of banknotes from the rejection unit 33 after the deposit process is suspected to be fraudulent or not.

In the withdrawal fraud determination process, the controller 25 may transmit determination result information to external equipment via the communicator 28. Similarly, in the deposit fraud determination process, the controller 25 may transmit determination result information to the external equipment via the communicator 28.

In the withdrawal banknote transport process, in a case where banknotes remaining in the withdrawal unit 32 are transported to the retraction unit 35, the controller 25 may store, in the memory unit 27, information showing a result of recognition by the recognition unit 36 performed on banknotes remaining in the withdrawal unit 32. With such management, banknotes transported to the retraction unit 35 can be appropriately managed. Accordingly, when an operator (e.g., a customer of a bank) who left banknotes in the withdrawal unit 32 requests a return of "banknotes remaining in the withdrawal unit 32, the "banknotes remaining in the withdrawal unit 32" can be appropriately returned from banknotes housed in the retraction unit 35 by referring to the information stored in the memory unit 27.

(Variation of Third Embodiment)

In the money handling machine 1 according to the third embodiment, the first detector 21 may be configured to detect movement of a person in front of the money handling machine 1. For example, the first detector 21 may be an image sensor (camera) that captures an image forward of the money handling machine 1. In this case, the controller 25 analyzes the image forward of the money handling machine 1 acquired by the first detector 21 to thereby detect movement of the person in front of the money handling machine 1.

The money handling machine 1 according to the third embodiment may include the detector 20 for performing "detection of an action associated with removal of banknotes from the withdrawal unit 32" and "detection of the presence of banknotes in the withdrawal unit 32," instead of the first detector 21 and the second detector 22. For example, the detector 20 may be an image sensor (camera) that captures an image of the inside of the withdrawal unit 32. In this case, the controller 25 analyzes an image of the inside of the withdrawal unit 32 obtained by the detector 20 to thereby detect an "action associated with removal of banknotes from the withdrawal unit 32" and "whether banknotes are present in the withdrawal unit 32 or not."

In the deposit process according to the third embodiment, the rejected banknotes may be transported to the withdrawal unit 32. The deposit banknote transport process in this case is the same as the withdrawal banknote transport process. The deposit fraud determination process in this case is the same as the withdrawal fraud determination process.

Other Embodiments

In the foregoing description, banknotes are used as an example of money, but the present disclosure is not limited to this example. For example, money may be coins.

In the foregoing description, the retraction unit 35 is used as an example of the holder 13, but the present disclosure is not limited to this example. For example, the holder 13 may be the rejection unit 33, the temporary storage unit 34, a storage unit different from one of the first through fifth storage units 41 through 45 from which money remaining in the withdrawal unit 32 has been delivered, or a part of the transport path of the transport unit 50.

The money handling machine 1 of the second embodiment may include a plurality of storage units 11. In step S23 of the second embodiment, the storage unit 11 to which money remaining in the withdrawal unit 12 is transported may be a storage unit 11 different from the storage unit 11 from which the money was been delivered. For example, in step S23 of the second embodiment, money remaining in the withdrawal unit 12 may be transported to a storage unit 11 for collection in the plurality of storage units 11. Specifically, one of the first through fifth storage units 41 through 45 illustrated in FIG. 5 may be a storage unit for collection.

The embodiments and variations described above may be suitably combined. The foregoing embodiments and variations are merely preferred examples in nature, and are not intended to limit the disclosure, applications, and use of the application.

What is claimed is:

1. A money handling machine configured to handle money, the money handling machine comprising:

a storage configured to store money;

an outlet configured to receive money delivered from the storage in the outlet, the outlet being configured to allow the money to be removed from inside of the outlet;

a detector configured to detect a removal action associated with removal of the money from the outlet;

a holder configured to hold the money;

recognition circuitry configured to recognize the money; and control circuitry configured to switch a process on money remaining in the outlet, based on a result of detection by the detector, wherein the control circuitry is configured to perform a first process of controlling an operation of the money handling machine such that the money remaining in the outlet is transported to the storage in a case where the detector does not detect the removal action, and a second process on the money remaining in the outlet in a case where the detector detects the removal action, the second process being different from the first process, and in the second process, the control circuitry is configured to control an operation of the money handling machine such that the money remaining in the outlet is transported to the holder in a case where a first recognition result and a second recognition result do not coincide with each other, the first recognition result being a result of recognition by the recognition circuitry performed on money delivered from the storage and received by the outlet, the second recognition result being a result of recognition by the recognition circuitry performed on the money remaining in the outlet, and control an operation of the money handling machine such that the money remaining in the outlet is transported to the storage in a case where the first recognition result and the second recognition result coincide with each other.

2. The money handling machine according to claim 1, wherein the control circuitry is configured to perform the first process in a case where the detector does not detect the removal action before a lapse of a predetermined time from when the money delivered from the storage is received by the outlet.

3. The money handling machine according to claim 1, wherein the result of recognition by the recognition circuitry includes a serial number of the money.

4. The money handling machine according to claim 1, further comprising a temporary storage configured to temporarily store money, wherein the control circuitry is configured to control an operation of the money handling machine such that the money remaining in the outlet is delivered from the outlet, recognized in the recognition circuitry, and then stored in the temporary storage and acquire the second recognition result in the second process.

5. The money handling machine according to claim 4, wherein in the second process, the control circuitry is configured to control an operation of the money handling machine such that money stored in the temporary storage is transported to the holder in a case where the first recognition result and the second recognition result do not coincide with each other, and control an operation of the money handling machine such that money stored in the temporary storage is transported to the storage in a case where the first recognition result and the second recognition result coincide with each other.

6. The money handling machine according to claim 1, wherein the removal action includes movement of money removed from the outlet.

7. The money handling machine according to claim 6, wherein the movement of money from the outlet is movement of money from inside of the outlet to outside of the outlet.

8. The money handling machine according to claim 1, wherein the removal action includes movement of an object entering the outlet.

9. The money handling machine according to claim 8, wherein the object entering the outlet is a hand of a person who is removing money.

10. The money handling machine according to claim 1, wherein the removal action includes movement of a person in front of the money handling machine.

11. The money handling machine according to claim 1, wherein the detector detects the removal action and whether the money is present in the outlet or not.

* * * * *